(12) United States Patent
Wang (10) Patent No.: US 7,398,539 B2
(45) Date of Patent: Jul. 8, 2008

(54) HEIGHT-VARIABLE TYPE TURNTABLE ASSEMBLY AND OPTICAL DISK DEVICE INCLUDING THE SAME

(75) Inventor: Ji-Seok Wang, Kyunggi-do (KR)

(73) Assignee: Samsung Electro-Mechanics Co., Ltd, Kyunggi-Do (KR)

( * ) Notice: Subject to any disclaimer, the term of this patent is extended or adjusted under 35 U.S.C. 154(b) by 448 days.

(21) Appl. No.: 10/965,292

(22) Filed: Oct. 14, 2004

(65) Prior Publication Data

US 2005/0289581 A1 Dec. 29, 2005

(30) Foreign Application Priority Data

Jun. 23, 2004 (KR) .................. 10-2004-0047130

(51) Int. Cl.
*G11B 17/028* (2006.01)
(52) U.S. Cl. .............. 720/700; 720/605; 720/667; 720/691; 720/695; 720/696
(58) Field of Classification Search ........... 720/667, 720/700, 703, 605, 695, 696, 715
See application file for complete search history.

(56) References Cited

U.S. PATENT DOCUMENTS

| | | | | |
|---|---|---|---|---|
| 4,328,575 A | * | 5/1982 | Elliott | 369/269 |
| 5,056,078 A | * | 10/1991 | Carey et al. | 720/632 |
| 5,247,500 A | * | 9/1993 | Miyoshi et al. | 369/30.85 |
| 5,398,230 A | * | 3/1995 | Han | 720/667 |
| 5,416,762 A | * | 5/1995 | Ohmori et al. | 720/715 |
| 5,583,839 A | * | 12/1996 | Choi | 720/711 |
| 5,631,894 A | * | 5/1997 | Takahashi | 720/667 |
| 5,808,993 A | * | 9/1998 | Lee | 369/53.23 |
| 6,137,765 A | * | 10/2000 | Saito et al. | 720/691 |
| 2004/0071073 A1 | * | 4/2004 | Toyama et al. | 369/244 |

FOREIGN PATENT DOCUMENTS

JP  08235762 A  *  9/1996
KR  001162416     8/1998

* cited by examiner

*Primary Examiner*—Andrea Wellington
*Assistant Examiner*—Carlos E Garcia
(74) *Attorney, Agent, or Firm*—Gottlieb, Rackman & Reisman, P.C.

(57) ABSTRACT

The present invention relates generally to a turntable assembly for optical disks and, more particularly, to a height-variable type turntable assembly, which can adjust the height of a turntable to adjust the working distance between an object lens and an optical disk according to the type of optical disk placed on the turntable, and an optical disk device including the same. The height-variable type turntable assembly includes a turntable, a spindle motor for rotating the turntable, and a height adjustment device for supporting the spindle motor and driving the spindle motor in a vertical direction. Through such a structure, the working distance between the optical disk and the optical pick-up can be adjusted to correspond to at least three types of optical disks (e.g., CD, DVD and BD) while the DC sensitivity and tilt characteristics of the actuator of the optical pick-up is not considerably affected.

13 Claims, 10 Drawing Sheets

HEIGHT-VARIABLE TYPE TURNTABLE ASSEMBLY AND OPTICAL DISK DEVICE INCLUDING THE SAME

BACKGROUND OF THE INVENTION

1. Field of the Invention

The present invention relates generally to a turntable assembly for optical disks and, more particularly, to a height-variable type turntable assembly, which can adjust the height of a turntable to adjust the working distance between an object lens and an optical disk according to the type of an optical disk placed on the turntable, and an optical disk device including the same.

2. Description of the Related Art

Optical disks are used as information-recording media, which enable information to be recorded thereon and reproduced therefrom without coming in contact with a head for recording and reproducing information, and enable recording density to be increased.

As for the optical disks enabling information to be recorded thereon and reproduced therefrom, there are, for example, optical disks using phase-change type recording layers in which crystalline and amorphous phases are alternated by the irradiation of laser light.

Information is recorded on such optical disks in such a way as to irradiate laser light, which has been modulated based on an information signal to be recorded, onto information-recording surfaces thereof.

As for the optical disks using the phase-change type recording layers that enable information to be recorded thereon and reproduced therefrom, there are Digital Versatile Disks (DVDs). The DVDs have high recording density compared to conventional Compact Disks (CDs). For example, the CDs are formed to have a track pitch of 1.6 μm, while the DVDs are formed to have a track pitch of 0.74 μm. In addition, Blu-ray Disks (BDs) having a track pitch of 0.3 μm has been recently proposed as a new optical disk.

Such a BD is formed to have recording density higher than those of the conventional CD and DVD, so that an amount of information can be recorded on the BD compared to other optical disks of the same size. In practice, the maximum storage capacities of the CD and the DVD are about 650 MB and 4.7 GB, respectively, while the maximum storage capacity of the BD is about 25 GB.

Information recorded on the information-recording surface of an optical disk is read and reproduced through the following steps. That is, an optical disk is placed on a turntable, the optical disk is rotated together with the turntable by the driving of a spindle motor, and an optical pick-up equipped with an object lens horizontally reciprocates in the radial direction of the optical disk (direction along which the turntable assembly is formed), so that the reading and reproduction of the optical disk by the optical pick-up is achieved.

Meanwhile, the distance between the object lens of the optical pick-up and the information-recording surface of the optical disk is referred to as a focal distance or working distance, and a process of adjusting the working distance is required to accurately read the information recorded on the information-recording surface. Additionally, the working distance should be differently applied according to the type of an optical disk.

For example, the CD has a structure in which a transparent substrate about 1.2 mm thick is formed on the information-recording surface thereof. In this case, the wavelength of laser light used for the CD is about 780 nm and the value of a numerical aperture NA is 0.45. The DVD has a structure in which a transparent substrate about 0.6 mm thick is formed on the information-recording surface thereof. In this case, the wavelength of laser light used for the DVD is about 650 nm and the value of a numerical aperture NA is 0.60. Additionally, the BD has a structure in which a cover layer about 0.1 mm thick is formed on the information-recording surface thereof. In this case, the wavelength of laser light used for the BD is about 400 nm and the value of a numerical aperture NA is 0.85.

As described above, the working distance between the object lens and the optical disk should be differently applied according to the types of optical disks (e.g., CD, DVD and BD). Generally, the working distance is adjusted by adjusting the posture and location of the object lens in the optical pick-up.

Figure 1:
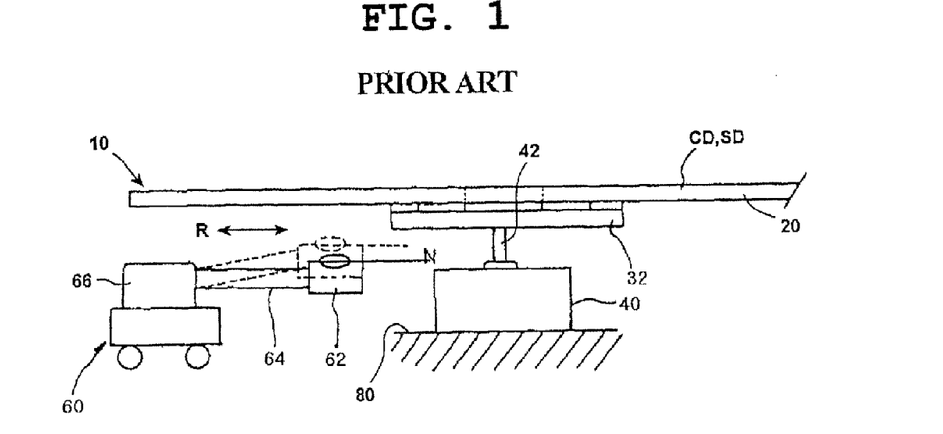
FIG. 1 is a view schematically showing an optical disk device according to an example of the prior art.

FIG. 1 is a view schematically showing the principal part of an optical disk device 10 according to an example of the prior art. Referring to FIG. 1, a spindle motor 40 is secured to a base 80, and a turntable 32 is mounted on the rotating shaft 42 of the spindle motor 40. Various types of optical disks 20 are placed on the turntable 32, and an optical pick-up 60 for reading information from a placed optical disk is placed on a portion of the base 80. The optical pick-up 60 can move in the radial direction of the optical disk (the direction indicated by an arrow R) below the optical disk. An actuator 66 is provided in the optical pick-up 60 and the object lens 62 is supported by wires 64 secured to the actuator 66.

The object lens 62 is constructed to move in a vertical direction (focusing direction) and a horizontal direction (tracking direction). In practice, the location of the object lens relative to the optical disk is controlled through the control of a tracking servo (not shown) and a focusing servo (not shown). In this case, the focusing servo controls the movement of the object lens in a vertical direction, so that the working distance between the object lens and the optical disk can be adjusted through the control of the focusing servo.

In the optical disk device, the working distance is adjusted by vertically moving the object lens of the optical pick-up toward the surface of the optical disk. In this case, the movement range of the object lens in which linearity is guaranteed, that is, the movable range of a focus in which the linearity is guaranteed is implemented within a range of 0.8 to 1.2 mm. However, the movement range of a focus is insufficient to allow all of the CD, the DVD and the BD to be compatible with the optical disk device, and a dual deck system, in which different decks are applied depending on optical disks, may be required to deal with all of the CD, the DVD and the BD.

Furthermore, since the optical disk device adopts a method of adjusting the working distance between the object lens and the optical disk by driving the object lens of the optical pick-up, the Direct Current (DC) sensibility (DC follow-up property) and tilt characteristics of the actuator can be considerably affected when the object lens is excessively adjusted.

Figure 2A:
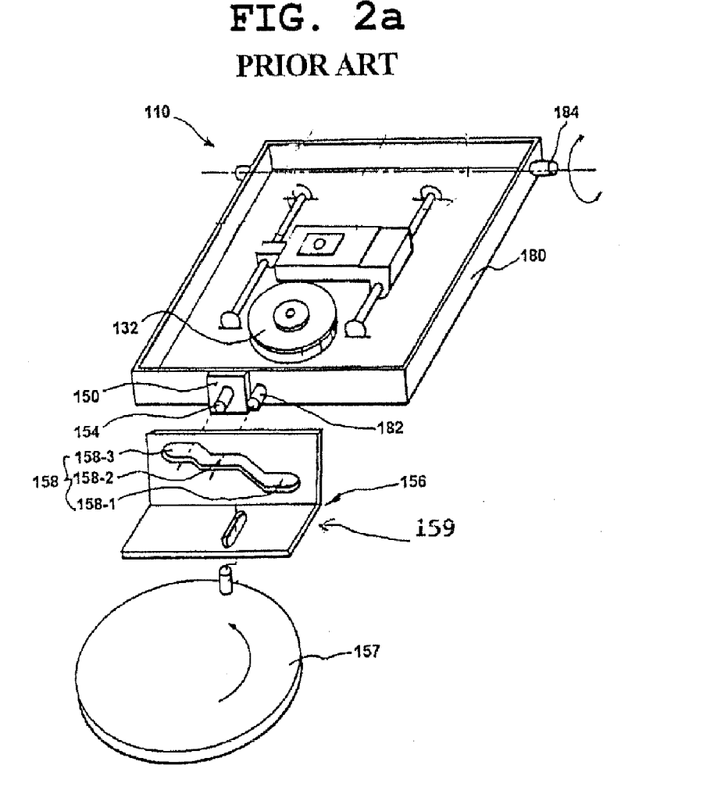
FIGS. 2a and 2b are an exploded perspective view of an optical disk device and a sectional view of a turntable assembly according to another example of the prior art.
Figure 2B:
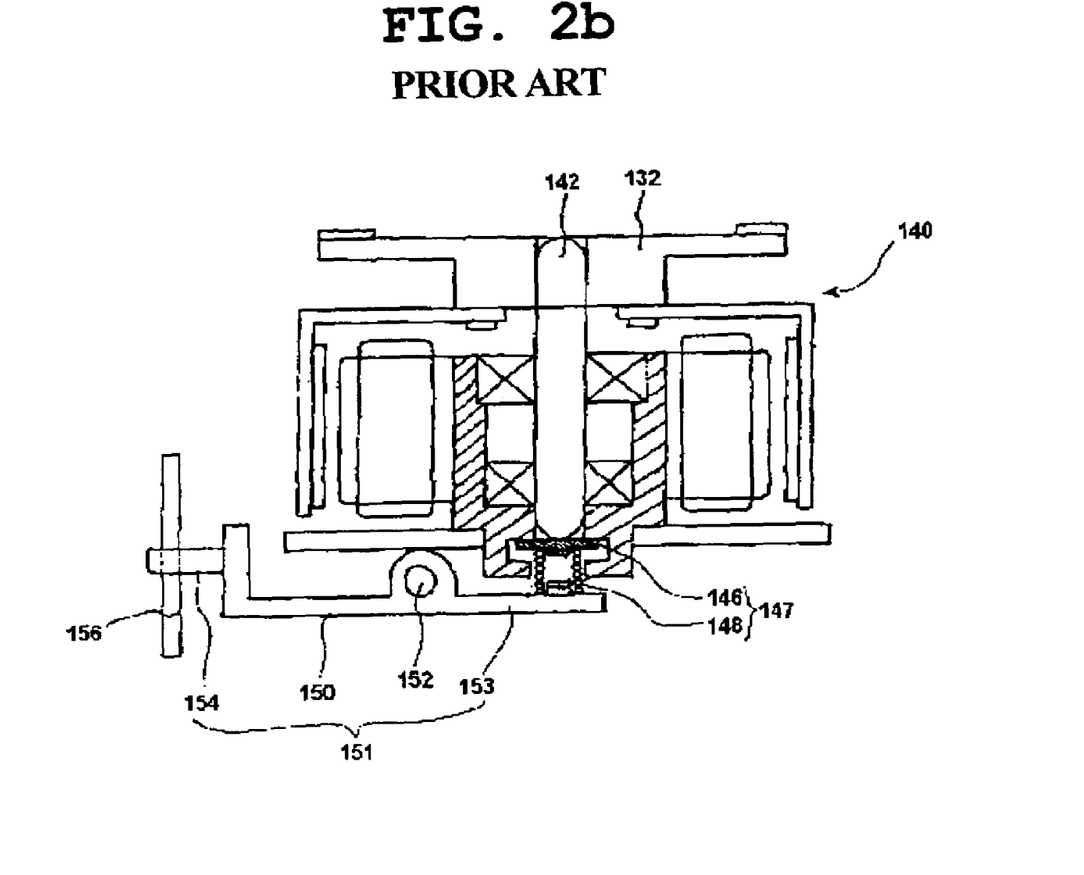

Meanwhile, a turntable device capable of adjusting the working distance between an optical disk and an object lens by directly driving a turntable is disclosed in Korean Pat. No. 162416 (registered on Aug. 29, 1998). FIGS. 2a and 2b are an exploded perspective view of an optical disk device 110 and a sectional view of a turntable device 130, respectively, which are disclosed in Korean Pat. No. 162416 according to another example of the prior art.

The turntable device of FIGS. 2a and 2b includes a turntable 132, a vertical movement support unit 147 for supporting the movement of the turntable in a vertical direction, a vertical movement drive unit 151 for driving the turntable in a vertical direction, and a vertical movement control unit 159 for controlling the height of the turntable that moves in a vertical direction.

In particular, in the conventional turntable device, the vertical movement support unit 147 includes a rotating shaft support plate 146 for directly supporting the rotating shaft 142 of the turntable and an elastic member 148 for providing elastic restoring force to the rotating shaft support plate 146. The rotating shaft 142, together with surrounding rotator and stator, constitutes a spindle motor 140. The vertical movement drive unit 151 includes a vertical movement drive member 150 that is combined with a portion of the vertical movement support unit 147 using a hinge 152, and is combined with the elastic member 148 of the vertical movement support unit 147 on an inner portion thereof. The vertical movement control unit 159 includes a drive plate 156 in which a multi-stage guide slot 158 for guiding an interlock pin 154 formed at an outer end of the vertical movement drive member 150 is formed, and a drive cam 157 for driving the drive plate 156. The deck interlock pin 182 of the deck 180 is inserted into and guided by the multi-stage guide slot 158.

The operational principle of the conventional turntable device is described below. The drive plate 156 interlocked with the interlock pin 154 moves in a left direction of the drawing under the control of the vertical movement control unit 159 (refer to the rotating range of the drive cam shown in FIG. 2a). In the case where a difference in height between the interlock pin 154 and the deck interlock pin 182 occurs while the drive plate 156 moves, the vertical movement drive member 150 is rotated around the hinge 152. An end portion of the vertical movement drive member 150 is lowered by the rotation of the vertical movement drive member 150, and the vertical movement support unit 147 combined with the end portion 153 is also lowered, so that the height of the turntable is lowered.

The conventional turntable device can deal with different working distances in such a way that the height of the turntable is set based on an optical disk whose working distance is relatively short (e.g., DVD) and the height of the turntable is lowered in the case where the optical disk whose working distance is relatively long (e.g., CD) is placed. Accordingly, the conventional turntable device has a structure to which all optical disks (e.g., CD and DVD) can be applied.

However, the conventional turntable device is basically manufactured to deal with two types of optical disks, and it is difficult to apply three types of optical disks, including a BD that is recently proposed, to the conventional turntable device.

For example, in the conventional turntable device, the multi-stage guide slot 158 is formed to be divided into a first guide part 158-1, a second guide part 158-2 and a third guide part 158-3, and the posture of the deck 180 and the turntable 132 is controlled based on the relative locations of the interlock pin 154 of the vertical movement drive member 150 and the deck interlock pin 182 of the deck 180.

In practice, the posture of the deck 180 and the turntable 132 is controlled through the optical disk loading step of lowering the entire surface of the deck 180 using the rotating shaft 184 as a hinge, the first disk placing step of placing an optical disk whose focal distance is short (e.g., DVD) and the second disk placing step of placing an optical disk whose focal distance is long (e.g., CD). It is difficult to apply a third optical disk, such as a BD, to the conventional turntable device in view of the above-described structure.

Furthermore, the conventional turntable device can be basically applied to a structure in which a deck can be rotated by a hinge shaft, but cannot be applied to an optical disk device in which a deck itself is horizontally secured.

Furthermore, the conventional turntable device has a structure in which the interlock pin of the turntable (more accurately, the interlock pin of the vertical movement drive member) and the interlock pin of the deck are driven while being inserted into the multi-stage guide slot, and the relative height relationship between the deck and the turntable is used. Accordingly, it is impossible to provide a turntable device to which three types of optical disks can be applied even though a guide slot having one more stage is formed.

Furthermore, in the conventional turntable device, the control of the vertical movement of the turntable is achieved through a plurality of connection structures in which related elements are connected in the sequence of the drive cam→the drive plate→the interlock pin→the vertical movement drive member (hinge)→the rotating shaft support plate→the rotating shaft→the turntable, so that it is difficult to maintain the precision of the control.

Besides, in the case of the conventional turntable, errors may occur in the manufacture of the respective elements, and operational errors can occur as the manufacturing errors are accumulated.

SUMMARY OF THE INVENTION

Accordingly, the present invention has been made keeping in mind the above problems occurring in the prior art, and an object of the present invention is to provide a height-variable type turntable assembly in which the height of a turntable can be adjusted to correspond to at least three types of optical disks.

Another object of the present invention is to provide an optical disk device including the height-variable type turntable assembly, in which the working distance between an optical disk and an object lens can be adjusted to correspond to at least three types of optical disks.

In order to accomplish the above object, the present invention provides a height-variable type turntable assembly insertable into a through hole formed on a portion of a deck, including a turntable on which an optical disk is placed, a spindle motor including a rotating shaft combined with a center of a bottom of the turntable to rotate the turntable using the rotating shaft, and a height adjustment means for driving the spindle motor in a vertical direction, the height of the turntable is adjusted by the driving of the height adjustment means.

In accordance with the present invention, the height adjustment means may include an adjustment motor including a drive shaft, and a vertical drive means adapted to support the spindle motor and to be driven in a direction perpendicular to the horizontal plane of the deck in correspondence with rotation of the drive shaft of the adjustment motor.

In accordance with the present invention, the drive shaft may be combined with a drive gear, and the vertical drive means may include at least one gear and at least one cam engaged with the drive gear.

In accordance with the present invention, the drive shaft may be perpendicular to the horizontal plane of the deck.

In accordance with the present invention, the drive shaft may be parallel to the horizontal plane of the deck, and the vertical drive means may include at least one worm gear.

In accordance with the present invention, the number of the vertical drive means may be at least two.

In accordance with the present invention, a chassis may be interposed between the vertical drive means and the spindle motor, and adapted to support the entire bottom of the spindle motor.

In accordance with the present invention, the height-variable type turntable assembly may further include a bracket configured in such a way that one side thereof is secured to the bottom of the deck and the other side thereof supports the adjustment motor, the adjustment motor may be fixedly supported by the bracket.

In accordance with the present invention, the vertical drive means may be supported by the bracket.

In order to accomplish the above object, the present invention provides an optical disk device including a height-variable turntable assembly, including a deck having a rectangular-shaped body, a through hole formed on a portion thereof and a center opening formed at the center thereof, a turntable assembly inserted into the through hole to support and rotate an optical disk, an optical pick-up configured to be reciprocated in a direction extending to the through hole within the center opening, and provided with an object lens maintaining a certain working distance with the optical disk, and an optical pick-up drive means for reciprocating the optical pick-up in a horizontal direction, the turntable assembly including a turntable on which the optical disk is placed, a spindle motor including a rotating shaft combined with the center of the bottom of the turntable to rotate the turntable by the rotating shaft, and a height adjustment means for driving the spindle motor in a vertical direction under the deck, the working distance between the object lens and the optical disk may be adjusted by adjusting the height of the turntable by the height adjustment means.

In accordance with the present invention, the optical disk device may further include an identification means for identifying the type of an optical disk, the height adjustment means may adjust the height of the turntable according to the result of the identification of the identification means.

BRIEF DESCRIPTION OF THE DRAWINGS

The above and other objects, features and advantages of the present invention will be more clearly understood from the following detailed description taken in conjunction with the accompanying drawings, in which:

FIG. 5 is a sectional view taken along line V-V of FIG. 4;

DESCRIPTION OF THE PREFERRED EMBODIMENTS

Preferred embodiments of the present invention are described in detail with reference to the attached drawings below.

First Embodiment

Figure 3:
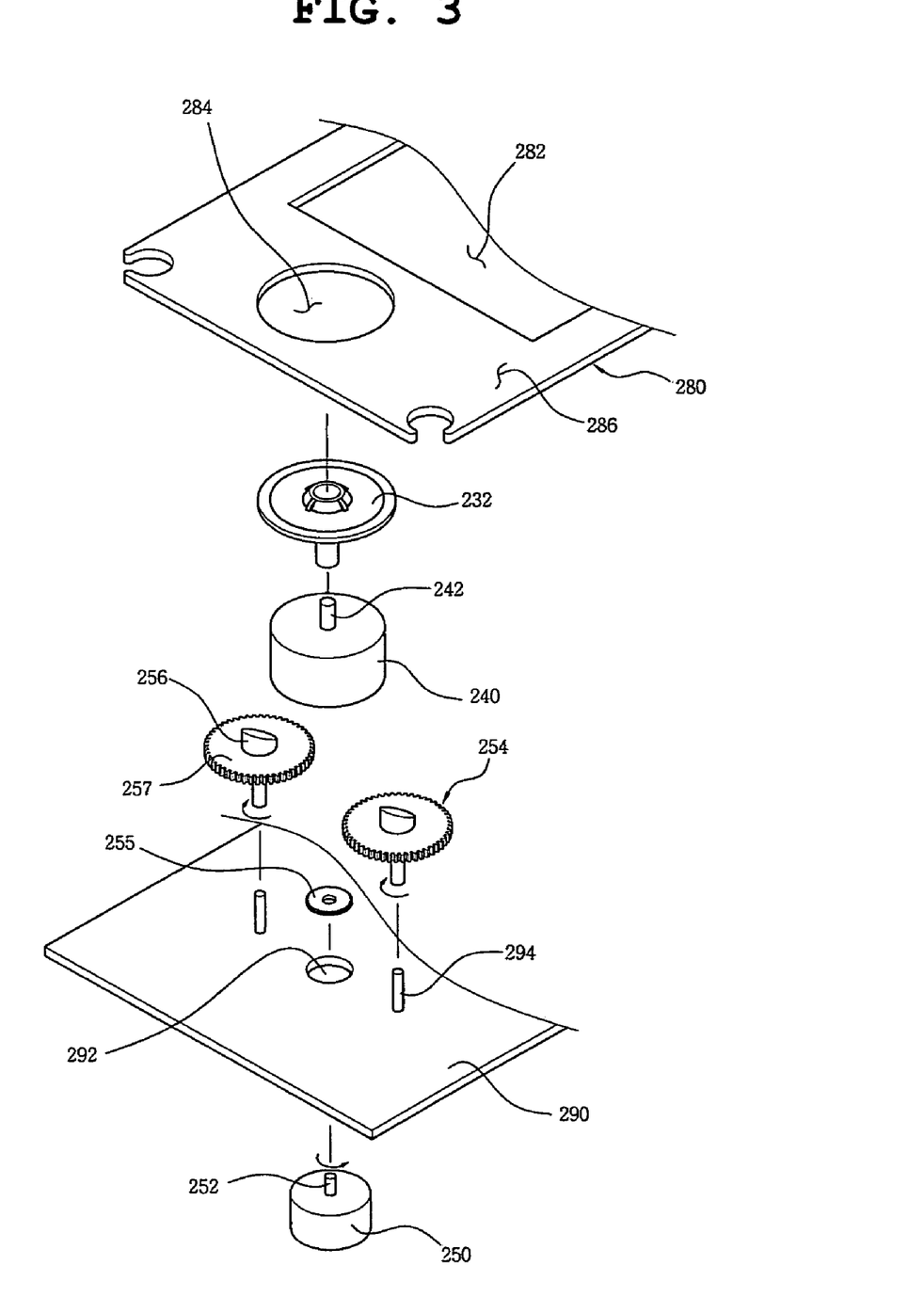
FIG. 3 is an exploded perspective view showing a turntable assembly according to a first embodiment of the present invention.
Figure 4:
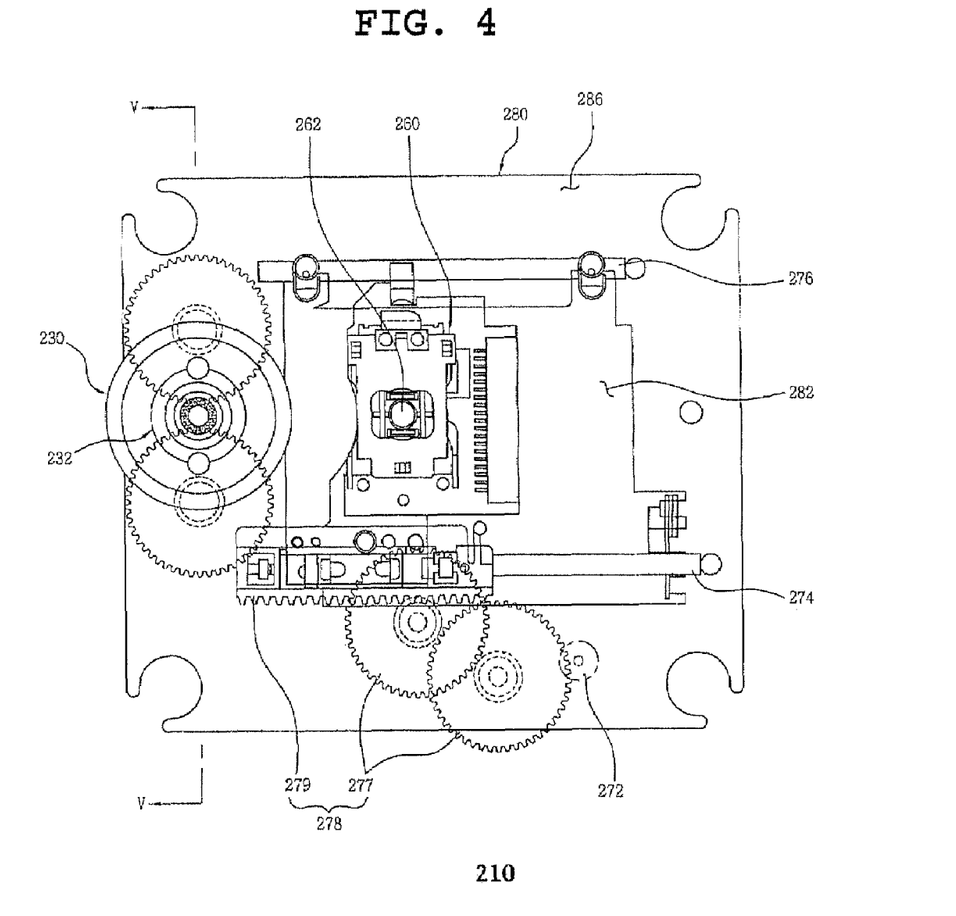
FIG. 4 is a plan view schematically showing an optical disk device including the turntable assembly of FIG. 3.

FIG. 3 is an exploded perspective view showing a turntable assembly 230 according to a first embodiment of the present invention. FIG. 4 is a plan view schematically showing an optical disk device 210 including the turntable assembly 230 of FIG. 3. FIG. 5 is a sectional view taken along line V-V of FIG. 4. The preferred embodiment of the present invention is described with reference to FIGS. 3 to 5.

In the first embodiment of the present invention, the optical disk device 210 is divided into a turntable assembly 230 on which an optical disk 220 is placed, an optical pick-up 260 for irradiating laser light on the information-recording surface of the optical disk 220 and detecting laser light reflected from the information-recording surface, optical pick-up drive means for reciprocating the optical pick-up in the radial direction of the optical disk, and a deck 280 with which the turntable assembly 230, the optical pick-up 260 and the optical pick-up drive means are combined.

The turntable assembly 230 is divided into a turntable 232 on which an optical disk is placed, and a spindle motor 240 for rotating the turntable. The turntable assembly 230 is generally combined with the deck 280 through a through hole 284 formed on a portion of the deck 280.

The optical pick-up 260 is located in a center opening 282 formed at the center of the deck 280, and horizontally reciprocated in the direction extending to the turntable assembly 230 within the center opening. Furthermore, the optical pick-up 260 includes an object lens 262 for focusing the irradiated laser light on the information-recording surface above the optical pick-up 260.

Furthermore, the optical pick-up 260 is driven by the optical pick-up drive means formed to both sides thereof. The optical pick-up 260 includes a drive motor 272 fixed on the deck 280, a pair of guide bars 274 and 276 formed to both sides of the optical pick-up 260 along the driving direction of the optical pick-up 260, and an engagement means 278 for converting the rotating movement of the drive motor 272 into linear movement and directly driving the optical pick-up 260. The engagement means 278 includes at least a pair of gears 277, and a rack 279 having threads engaged with the gears.

In addition to such the structure, the first embodiment of the present invention proposes the structure of a turntable assembly 230 in which the height of the turntable 232 is adjusted in a vertical direction. The turntable assembly 230 according to the characteristics of the present invention includes a height adjustment means that is located under the spindle motor 240 and directly drives the spindle motor in a vertical direction.

The height adjustment means includes an adjustment motor 250 having a drive shaft 252 and a vertical drive means for supporting the bottom of the spindle motor 240. In this case, the drive shaft 252 is fastened in a vertical direction with respect to the horizontal plane 286 of the deck 280. The vertical drive means is formed of a combination of a drive gear 255 and a cam gear 254, and the drive gear 255 is combined with the drive shaft 252 of the adjustment motor 250. The cam gear 254 includes a gear 257 engaged with the drive gear 255, and a cam 256 adapted to support the spindle motor 240.

The adjustment motor 250 and the vertical drive means are attached to and supported by a bracket 290, and the bracket 290 itself is combined with and secured to the bottom of the deck 280 on a side (not shown) of the bracket 290. For example, a through hole 292 into which the drive shaft of the adjustment motor 250 is inserted is formed at the center of the bracket 290, and a support 294 combined with the center of the bottom of the cam gear 254 to support the rotation of the cam gear 254 can be formed on the top of the bracket 290.

Furthermore, since the adjustment motor 250 is configured in such a way that the drive shaft 252 thereof is inserted into the bracket 290, it is preferable that the top of the adjustment motor 250 is attached to the bottom of the bracket 290 using a fastening means (not shown), such as a bolt.

Furthermore, it is preferable that at least two vertical drive means are formed, and the cams 256 formed on the cam gears 254, respectively, are configured to support the bottom of the spindle motor 240 at the same height in the case where the drive shaft of the adjustment motor 250 is rotated in a random range.

The cam 256 of the cam gear 254 directly supports the bottom of the spindle motor 240 in FIG. 3. However, the present invention can be constructed in such a way that a chassis (not shown) is attached to the bottom of the spindle motor 240 and the cam supports the chassis. In the case where the chassis is interposed between the cam 256 and the spindle motor 240, the inconvenience, in which the cam 256 must be formed beneath the bottom of the spindle motor 240, can be solved, and there is an advantage in that the cam gear 254 to which the cam 256 is attached can be arranged at one of various locations.

The height of the turntable 232 is adjusted using the height adjustment means of the turntable assembly 230. An operation of adjusting the height of the turntable 232 is described below.

The height of the turntable 232 is adjusted by moving the spindle motor 240, with which the turntable 232 is combined, in a vertical direction, and the spindle motor 240 moves in a vertical direction by the rotation of the cam gear 254 that directly supports the spindle motor 240. The cam gear 254 includes the gear 257 to be engaged with the drive gear 255 that is combined with the drive shaft 252 of the adjustment motor 250, and the cam 256 for directly supporting the spindle motor.

The height of the cam 256 is adjusted by the rotation of the cam gear 254, so that the height of the cam 256 is adjusted depending on the rotating direction of the drive gear 255, and thus, the height of the turntable 232 mounted on the spindle motor 240 is adjusted.

The drive gear 255 is combined with the drive shaft 252 of the adjustment motor 250, and the adjustment motor 250 is driven according to the identification result of an identification means for identifying the type of an optical disk (e.g., CD, DVD or BD), so that the rotating direction or rotating range of the drive gear 255 can be determined.

The identification means can be separately provided or be constructed using the optical pick-up. A method of identifying the type of optical disk is described using the optical pick-up below. That is, the type of an optical disk (e.g., CD, DVD or BD) can be identified in such a way that an optical disk is loaded, an optical pick-up irradiates an S-curve signal and a difference in signal reflected from the information-recording surface of the optical disk is used.

Furthermore, in FIG. 3, the height adjustment means is constructed in such a way that two cam gears 254 are combined with a single adjustment motor, but this is only an embodiment, so that a plurality of cam gears 254 can be included in the height adjustment means in case of necessity. Furthermore, it is shown in FIG. 3 that the cam gear 254 is directly combined with the spindle motor, but the present invention does not need to be limited to this case. For example, a chassis for supporting the spindle motor 240 may be interposed between the cam gear 254 and the spindle motor 240, and the cam gear 254 may support a random location of the chassis.

Figure 6A:
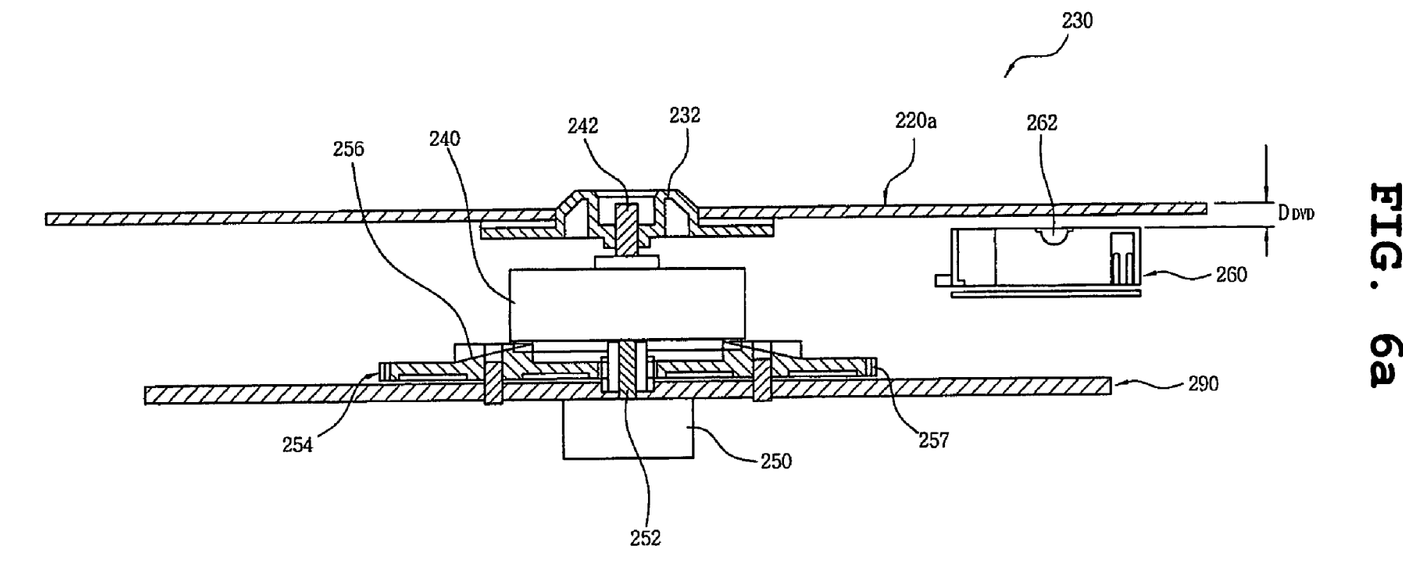
FIGS. 6a to 6c are sectional views showing the turntable assembly of FIG. 5 to which a DVD, a CD and a BD are applied, respectively.
Figure 6B:
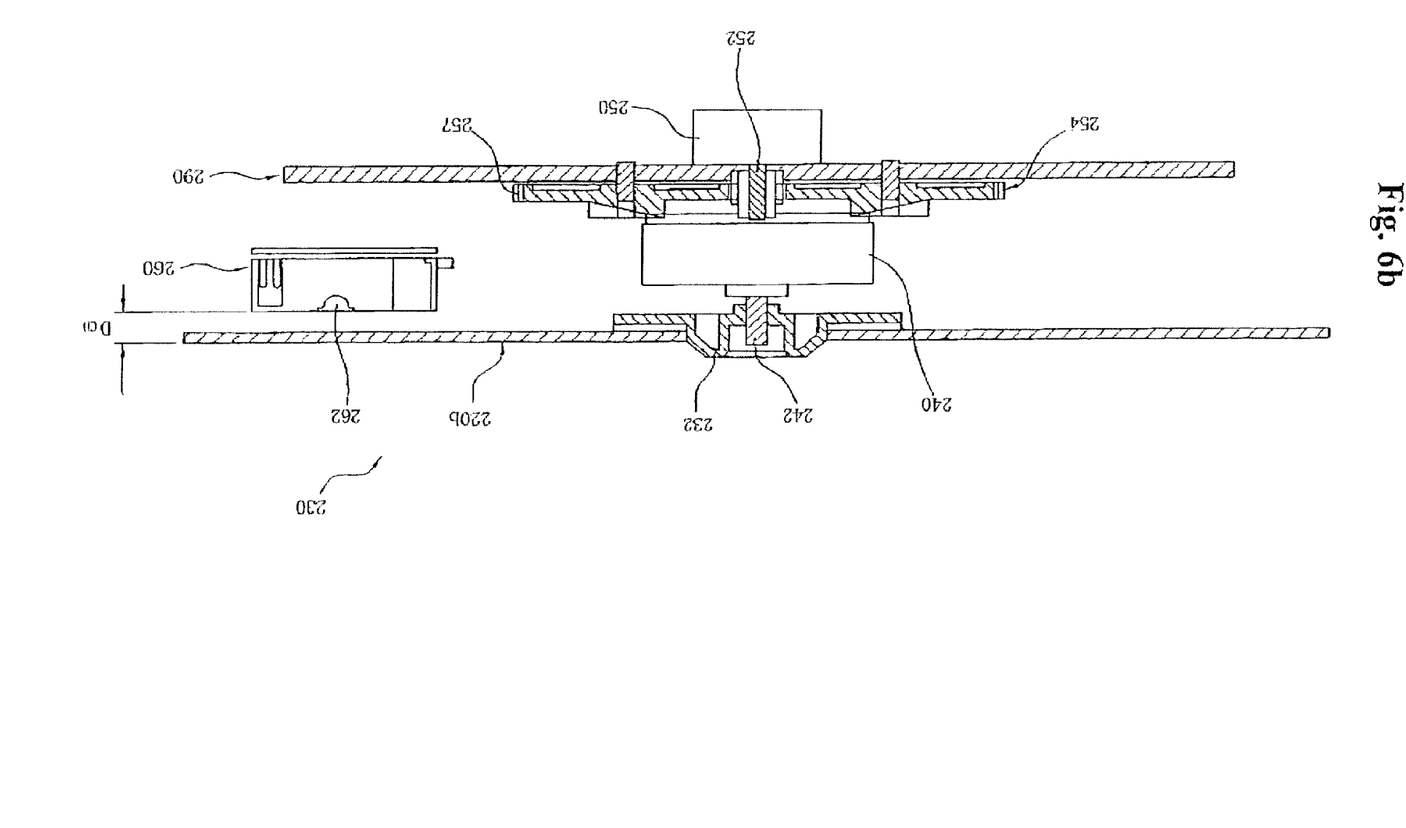
Figure 6C:
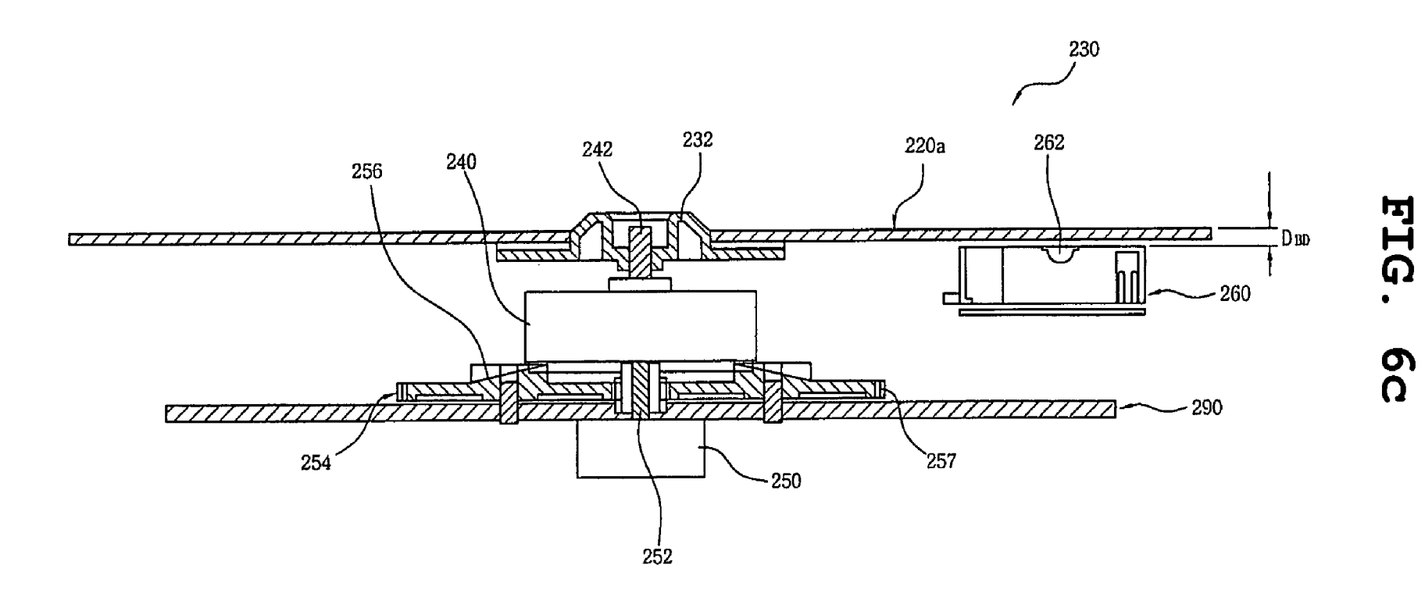
Figure 7:
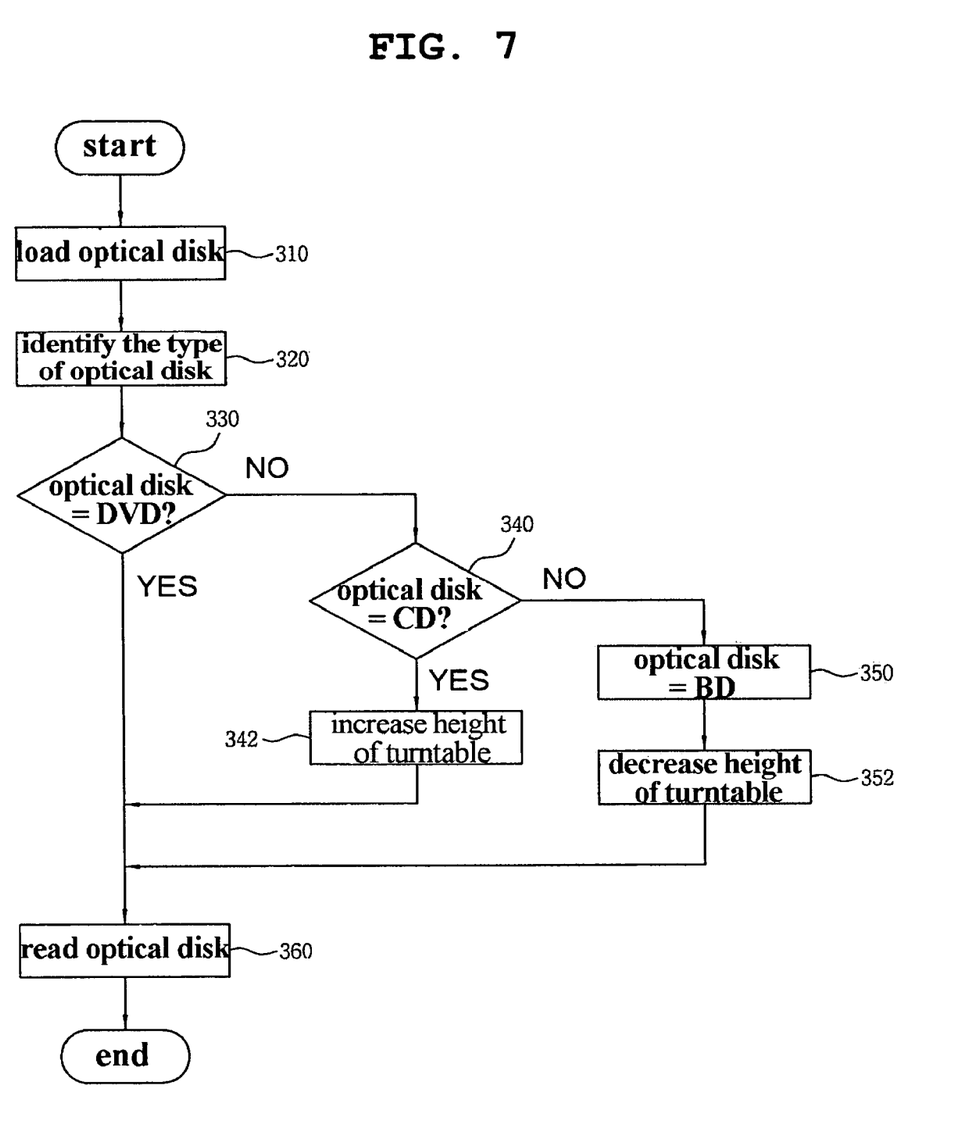
FIG. 7 is a flowchart showing a process of adjusting the height of the turntable using the turntable assembly according to the present invention.

FIGS. 6a to 6C are sectional views showing the states in which optical disks, that is, a DVD, a CD and a BD, are placed on the turntable and the working distances between the optical disks and an optical pick-up 260 are adjusted, respectively. FIGS. 6a to 6c are views showing the movement of the turntable assembly of FIG. 5 in a vertical direction, which show the location of the optical pick-up 260 in addition to the elements of FIG. 5. These views show the relative locations of the optical pick-up to show examples of the working distances between the optical pick-up and optical disks. FIG. 7 is a flowchart showing a process of adjusting the working distance between an optical disk and the optical pick-up to correspond to the types of optical disks (e.g., CD, DVD and BD) using the turntable assembly 230 of the present invention.

With reference to FIGS. 6a to 7, the operational principle of the turntable assembly according to the first embodiment of the present invention is described below. For the reference, it is assumed that the optical pick-up 260 is fixed on a portion of the deck 280 and the posture and location of the object lens 262 of the optical pick-up 260 are fixed.

When optical disks 220a to 220c are loaded on the turntable 232, the type of a placed optical disk is identified by the identification means (not shown), and the working distance between the optical disk and the object lens 262 of the optical pick-up 260 is adjusted according to the result of the identification. As for the optical disks, three types of optical disks including a DVD, a CD and a BD are applied in this embodiment. When three types of optical disks are applied and the required working distances between the optical disks and the optical pick-up are compared, the working distance $D_{CD}$ for the CD is longest (refer to FIG. 6b), the working distance $D_{BD}$ for the BD is shortest (refer to FIG. 6c), and the working distance $D_{DVD}$ for the DVD is the distance falling between the $D_{CD}$ and the $D_{BD}$ (refer to FIG. 6a).

The working distance is adjusted through a process of adjusting the height of the spindle motor and the height of the turntable 232 combined with the rotating shaft 242 of the spindle motor. For example, based on the working distance for the DVD (refer to FIG. 6a), a process of increasing the height of the turntable (refer to 6b) is required in the case where the CD is applied as an optical disk because the working distance must be increased. In contrast, a process of decreasing the height of the turntable (refer to FIG. 6c) is required in the case where the BD is applied as an optical disk because the working distance must be decreased.

In practice, the height of the turntable may be adjusted according to the flowchart of FIG. 7.

The initial height of the turntable 232 on which an optical disk is placed is set to a height corresponding to a DVD. In this case, the height of the turntable corresponding to the DVD falls between the heights of the turntable corresponding to the CD and the BD.

In such an initial state, an optical disk is loaded to and placed on the turntable at step 310. The type of an optical disk placed on the turntable is identified by an identification means (not shown) at the time of loading the optical disk at step 320. The identification means may be separately provided, or be constructed using the optical pick-up 260. The height of the turntable assembly is selectively adjusted according to the type of the identified optical disk. A more detailed description is made below.

It is detected whether the optical disk is a DVD at step 330. If, as a result of the identification, the optical disk is a DVD, the height of the turntable is not adjusted (in this case, the working distance is DDVD) and the process proceeds to step 360 of reading the optical disk.

If, as a result of the identification, the optical disk is not the DVD, it is detected whether the optical disk is a CD at step 340. If, as a result of the detection, the optical is a CD, the process proceeds to step 360 of reading the optical disk through step 342 of increasing the height of the turntable (in this case, the working distance is $D_{CD}$).

If, as a result of the detection, the optical disk is not a CD, the optical disk is identified as a BD at step 350, and the process proceeds to step 360 of reading the optical disk through step 352 of decreasing the height of the turntable (in this case, the working distance is $D_{BD}$).

As described above, the height of the turntable is initialized to have a random height (in this embodiment, a height corresponding to the DVD) before an optical disk is placed, and the height of the turntable 232 is adjusted through the above-described steps whenever an optical disk is placed on the turntable.

Such a method of adjusting the height of the turntable is constructed based on the height corresponding to the DVD for convenience. However, the method may be constructed based on a height corresponding to another optical disk (e.g., CD or BD) differently from the above-described case.

For example, when the height of the turntable corresponding to the CD is set to an initial value, the height of the turntable is decreased by one level if the optical disk is identified as the DVD, and the height of the turntable is decreased by two levels (lower than the one level) if the optical disk is identified as the BD.

In contrast, when the height of the turntable corresponding to the BD is set to an initial value, the height of the turntable is increased by one level if the optical disk is identified as the DVD, and the height of the turntable is increased by two levels if the optical disk is identified as the CD.

Second Embodiment

Figure 8:
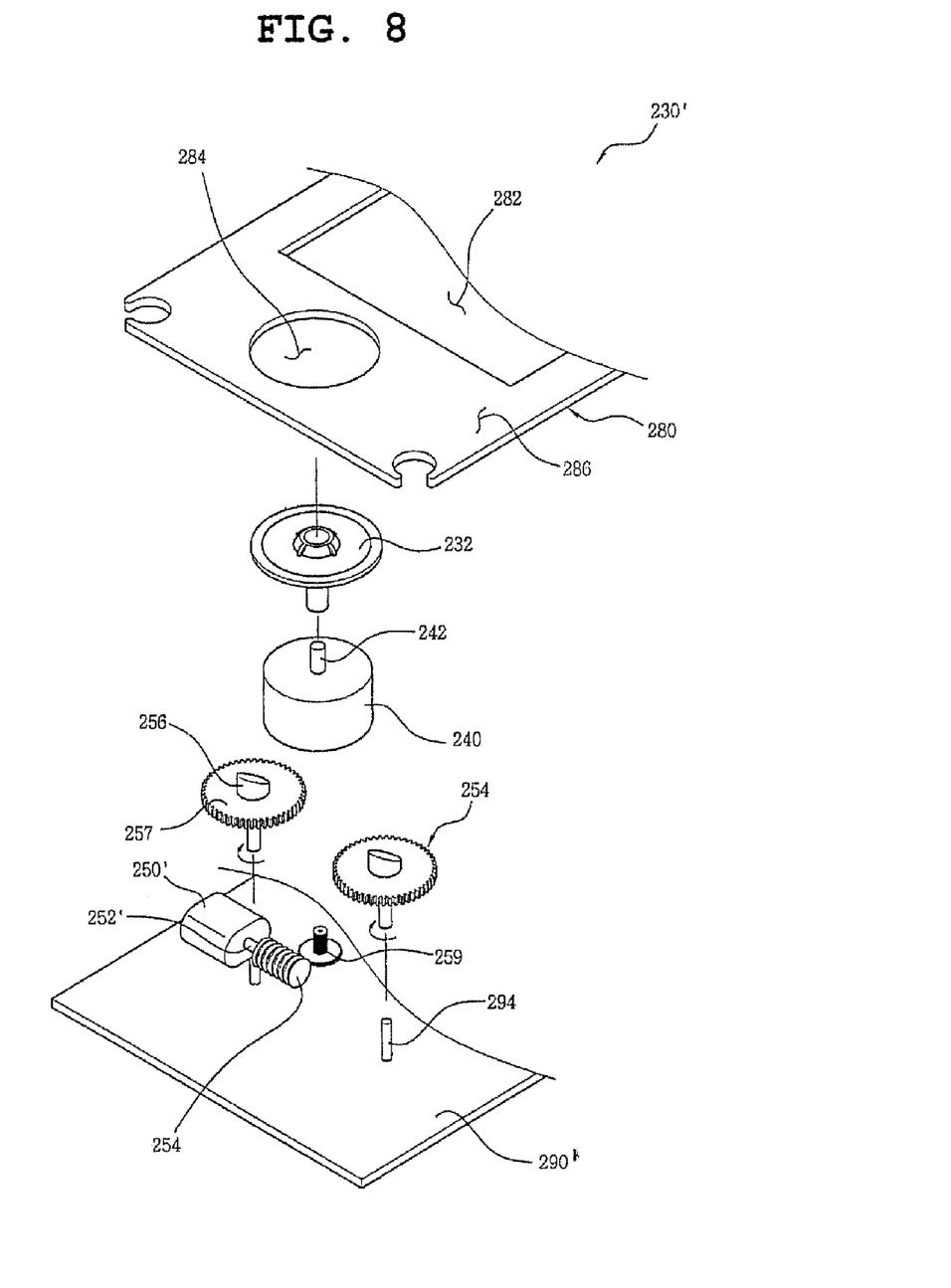
FIG. 8 is an exploded perspective view showing a turntable assembly according to a second embodiment of the present invention.

FIG. 8 is an exploded perspective view showing a turntable assembly 230' according to a second embodiment of the present invention.

In the second embodiment of the present invention, the turntable assembly 230' has a structure similar to that of the turntable assembly (refer to the turntable assembly 230 of FIG. 3) according to the first embodiment, but the adjustment motor 250' of a height adjustment means is different from that of the first embodiment. Accordingly, the same reference numerals are used to designate the same components, and detailed descriptions thereof are omitted.

In practice, in the first embodiment (hereinafter refer to FIG. 3), the adjustment motor 250 is constructed in such a way that the drive shaft 252 passes through the through hole 292 of the bracket 290 and the drive shaft 252 is perpendicular to the horizontal plane 286 of the deck 280. However, in the second embodiment, the adjustment motor 250' is constructed in such a way that a drive shaft 252' is attached to a bracket 290' while being parallel to the horizontal plane 286 of the deck 280, differently from the structure of the first embodiment.

Since the drive shaft 252' of the adjustment motor 250' is positioned in parallel to the horizontal plane 286 of the deck, an additional connection gear 259 is required to allow the drive shaft 252 to be connected to the cam gear 254, and the connection gear 259 is rotated by a drive gear 254' combined with the drive shaft 252'. In this case, it is preferable that a worm gear is used as the drive gear 254' to convert the axial direction of the drive shaft that is parallel to the horizontal plane of the deck 280 into the axial direction of the connection gear that is perpendicular to the horizontal plane of the deck.

The bracket 290' is different from the bracket 290 of FIG. 3 in that the adjustment motor does not need to be attached to the bottom of the bracket 290', so that the body of the optical disk device including the turntable assembly 230' can directly function as the bracket.

As shown in FIG. 8, according to the second embodiment of the present invention, the adjustment motor 250' is attached to the deck with the drive shaft 252' thereof being in a direction parallel to the horizontal plane of the deck, so that the entire size (perpendicular direction) of the turntable assembly 230' can be reduced compared to that of the first embodiment.

The turntable assembly having such a structure has the following advantages compared to embodiments of the prior art.

In contrast with the conventional method (an example of the prior art) of adjusting the working distance between an objects lens and an optical disk by directly driving the object lens, the present invention adopts the method of adjusting the working distance by directly driving a turntable on which the optical disk is placed, so that a driving range is relatively wide, thus being applied to various types of optical disks.

That is, in the conventional method, the location and posture of the object lens fastened by wires in the optical pick-up are adjusted. In this case, the movable range of a focus in the optical pick-up is insufficient be compatible with all of the optical disks (e.g., CD, DVD and BD), and a dual deck system, to which different decks are applied, according to an optical disk is required to correspond to three types of optical disks including a CD, a DVD and a BD. The problem can be solved by applying the structure of the present invention.

Since the present invention is constructed in such a way that the turntable, on which the optical disk is placed, is directly driven in a vertical direction, there can be provided a turntable assembly, which can be compatible with all of the three types of optical disks by properly adjusting the driving range of the turntable in a vertical direction.

Furthermore, in the case where the object lens is excessively adjusted to adjust the working distance in the conventional method, the DC sensitivity (DC follow-up property) and tilt characteristics of an actuator can be considerably affected. The problem can be solved by applying the structure of the present invention.

The present invention includes an adjustment motor attached on the bottom of the deck and a vertical drive means combined with the adjustment motor so as to drive the turntable in a vertical direction. The height of the turntable is adjusted by driving the height adjustment means, so that the present invention is advantageous in that the DC follow-up property of the actuator is excellent compared to the case where the object lens is directly driven, and the tilt characteristics of the object lens are not affected.

Additionally, in contrast with the conventional structure (another example of the prior art) that further includes a drive plate being rotated around a hinge and a vertical movement control unit for controlling the movement of the drive plate in addition to the optical disk device for driving the deck at the time of loading the optical disk, the present invention includes the height adjustment means for adjusting only the height of the turntable.

Since the conventional turntable device is a device in which the drive plate is rotated around the hinge based on the configuration of the multi-stage guide slot formed in the drive plate and the rotating range of the drive cam, so that a process of adjusting the working distance is considerably affected by the configuration of the multi-stage guide slot, the rotating range of the drive cam and the location of the hinge combined with the drive plate. As describe above, the conventional turntable device has a fixed structure in which it is impossible to modify a plurality of components related to the adjustment of the working distance after the components are arranged. Accordingly, optical disks applied to the conventional turntable device are limited to two types of optical disks (e.g., DVD and CD), and it is possible to adjust the working distance only within a limited range.

Since the turntable assembly of the present invention adopts the method of directly driving the adjusting motor, the height of the turntable supported by the cam can be precisely adjusted by properly rotating the cam of the cam gear connected to the adjustment motor, compared to the conventional method. That is, the height of the turntable is adjusted in proportion to the amount of power applied to the adjustment motor, and thereby, the height adjustment of the turntable of the present invention is limited only by the configuration of the cam of the cam gear.

Furthermore, the present invention is applied in conjunction with the driving of the object lens of the optical pick-up. In the conventional structure, the height of the turntable assembly is adjusted only at two locations that are limited by the multi-stage guide slot the configuration of the drive plate. In contrast, the present invention is advantageous in that it is possible to precisely adjust the height of the turntable by the rotation of the properly formed cam and the drive shaft adapted to rotate the cam, and it is possible to adjust the working distance in a wide range by adjusting the posture and location of the object lens.

As described above, since the height of the turntable is precisely adjusted, various types of optical disks can be applied to the turntable in case of necessity. It is preferable that three types of optical disks (e.g., CD, DVD and BD) are applied to the turntable.

Furthermore, the conventional turntable device can be basically applied to a structure in which the deck can be rotated around a hinge axis, while the present invention is not limited by such the structure.

Furthermore, in the conventional turntable device, the control of the vertical movement of the turntable is achieved through a plurality of connection structures in which related elements are connected in the sequence of the drive cam→the drive plate→the interlock pin→the vertical movement drive member (hinge) the rotating shaft support plate→the rotating shaft→the turntable, so that it is difficult to maintain the precision of the control. However, in the turntable device of the present invention, the adjustment of the working distance depends on the adjustment motor and the configuration of the cam of the cam gear connected to the adjustment motor, so that the precision of the control is considerably increased.

As described above, although the turntable assembly of the present invention has been described in detail with reference to the specific embodiments and the present invention has been disclosed based on the embodiments, the present invention is not limited to these embodiments. The scope of the present invention is limited and defined only by the following claims.

According to the present invention, the working distance between an optical disk and an optical pick-up can be adjusted according to the type of an optical disk, such as a CD, a DVD or a BD, and the working distance is adjusted by adjusting the height of a turntable on which the optical disk is placed rather than by adjusting the height of the object lens. Accordingly, the present invention can provide the height-variable type turntable assembly and an optical disk device including the same, in which at least three types of optical disks can be applied, and the DC sensitivity of the actuator of the optical pick-up and the tilt characteristics of the object lens are excellent.

What is claimed is:

1. A height-variable type turntable assembly insertable into a through hole formed on a portion of a deck, comprising:
    a turntable on which an optical disk is placed;
    a spindle motor including a rotating shaft combined with a center of a bottom of the turntable to rotate the turntable using the rotating shaft; and
    height adjustment means for driving the spindle motor in a vertical direction;
    wherein the height adjustment means includes:
        an adjustment motor including a drive shaft, said adjustment motor being stationary with respect to said deck, said drive shaft and said rotating shaft being co-axial; and
        first and second vertical drive means adapted to support the spindle motor and to selectively move said spindle motor a direction perpendicular to a horizontal plane of the deck in correspondence with rotation of said drive shaft; said first and second vertical drive means including respective first and second supports having the same shape and size, and acting parallelly and simultaneously.

2. The height-variable type turntable assembly as set forth in claim 1, wherein the drive shaft is combined with a drive gear, and the vertical drive means further includes at least one gear and at least one cam engaged with the drive gear.

3. The height-variable type turntable assembly as set forth in claim 2, wherein the drive shaft is perpendicular to a horizontal plane of the deck.

4. The height-variable type turntable assembly as set forth in claim 1, further comprising a bracket configured in such a way that a first side thereof is secured to a bottom of the deck and a second side thereof supports the adjustment motor,
    wherein the adjustment motor is fixedly supported by the bracket.

5. The height-variable type turntable assembly as set forth in claim 4, wherein the vertical drive means are supported by the bracket.

6. A height-variable type turntable assembly insertable into a through hole formed on a portion of a deck, comprising:
    a turntable on which an optical disk is placed;
    a spindle motor including a rotating shaft combined with a center of a bottom of the turntable to rotate the turntable using the rotating shaft; and
    height adjustment means for driving the spindle motor in a vertical direction;
    wherein the height adjustment means includes:
        an adjustment motor including a drive shaft, said adjustment motor being stationary with respect to said deck, said drive shaft and said rotating shaft being co-axial; and
        first and second vertical drive means adapted to support the spindle motor and to selectively move said spindle motor a direction perpendicular to a horizontal plane of the deck in correspondence with rotation of said drive shaft;
    wherein a chassis is interposed between the vertical drive means and the spindle motor, and adapted to support an entire bottom of the spindle motor.

7. An optical disk device including a height-variable turntable assembly, comprising:

a deck having a rectangular-shaped body, a through hole formed on a portion thereof and a center opening formed at a center thereof;

a turntable assembly inserted into the through hole to support and rotate an optical disk about a disk axis;

an optical pick-up configured to be reciprocated in a direction extending to the through hole within the center opening, and provided with an object lens maintaining a certain working distance with the optical disk; and optical pick-up drive means for reciprocating the optical pick-up in a horizontal direction, the turntable assembly including:

a turntable on which the optical disk is placed;

a spindle motor including a rotating shaft combined with a center of a bottom of the turntable to rotate the turntable by the rotating shaft; and height adjustment means for driving the spindle motor in a vertical direction under the deck; wherein said height adjusting means includes an adjustment motor and at least a first and second supports being coupled to said adjustment motor, having the same shape and size and being selectively rotatable about a respective support axis parallel to said disk axis, said spindle motor resting on said first and second supports, said first and second supports having respective support surfaces that act as cams to cause said spindle motor to move in a vertical direction as said first and said second supports are rotated by said adjustment motor.

8. The optical disk device as set forth in claim 7, further comprising identification means for identifying a type of an optical disk;

wherein the height adjustment means adjusts the height of the turntable according to a result of the identification of the identification means.

9. The optical disc as set forth in claim 7 further comprising gears coupling said adjustment motor to said support.

10. The optical disc as set forth in claim 7 wherein said adjustment motor is disposed under said spindle motor.

11. The optical disc set forth in claim 10 wherein said adjustment and spindle motors are arranged to rotate about a common vertical axis.

12. The optical disc of claim 7 wherein said adjustment motor includes a motor shaft rotating about a horizontal axis.

13. The optical disc of claim 12 wherein said height adjustment means includes a gear mounted on said support and a worm gear coupling said motor shaft and said gear.

* * * * *